United States Patent

[11] 3,632,159

[72] Inventor Chester J. Barecki
 Grand Rapids, Mich.
[21] Appl. No. 36,843
[22] Filed May 13, 1970
[45] Patented Jan. 4, 1972
[73] Assignee American Seating Company
 Grand Rapids, Mich.

[54] CANTILEVER VEHICLE DRIVER'S SEAT
 10 Claims, 15 Drawing Figs.
[52] U.S. Cl..................................................... 296/63,
 244/122 R, 297/451
[51] Int. Cl..................................................... B60n 1/00
[50] Field of Search........................................... 296/63, 64,
 65 R; 297/232, 346, 345, 451, 449; 248/188.1;
 244/122 R

[56] References Cited
UNITED STATES PATENTS
3,131,971 5/1964 Gunn............................ 297/449
2,859,063 11/1958 Underland..................... 296/65
3,147,994 9/1964 Lapine .......................... 296/65
FOREIGN PATENTS
978,468 11/1950 France ........................... 244/122
495,630 11/1938 Great Britain................. 297/346

Primary Examiner—Benjamin Hersh
Assistant Examiner—John A. Pekar
Attorney—Dawson, Tilton, Fallon & Lungmus ABSTRACT: A cantilever base frame has a vertical back attached to and suspended upon a vehicle front wall with a forwardly extending seat support portion connected to the back by inclined struts and the seat is slidably carried on the support which is also inclined upwardly to raise the seat as it is advanced.

PATENTED JAN 4 1972

INVENTOR
Chester J. Barecki

BY Dawson, Tilton, Fallon, and Lungmus
ATTORNEYS

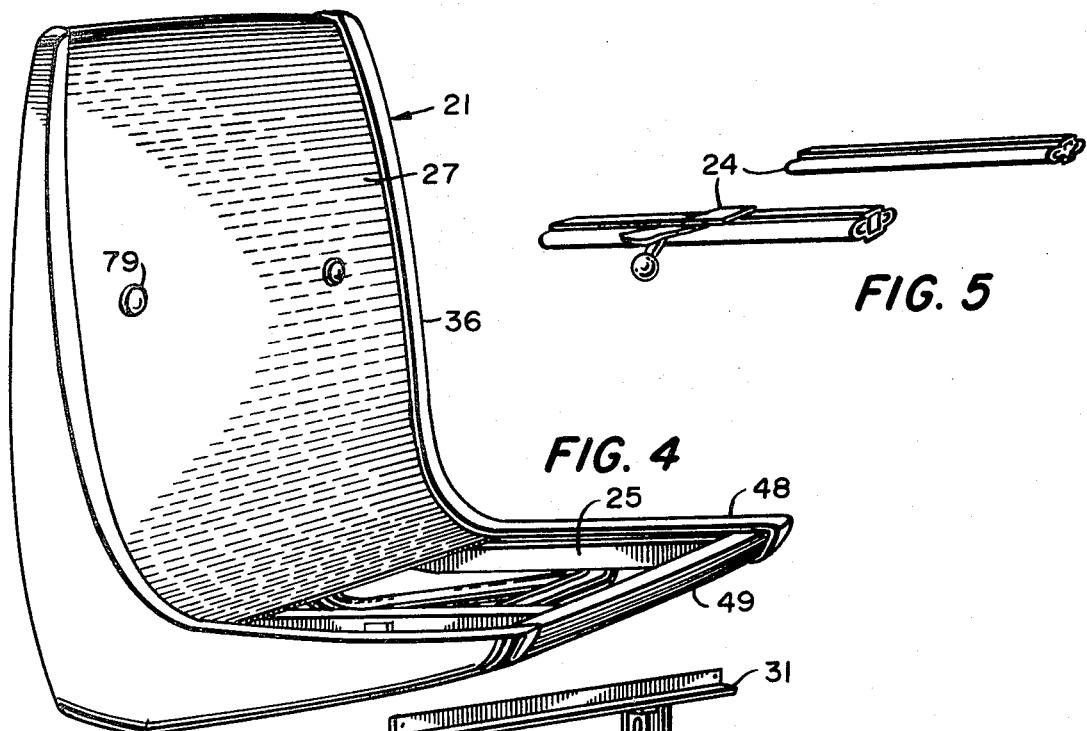
FIG. 4
FIG. 5
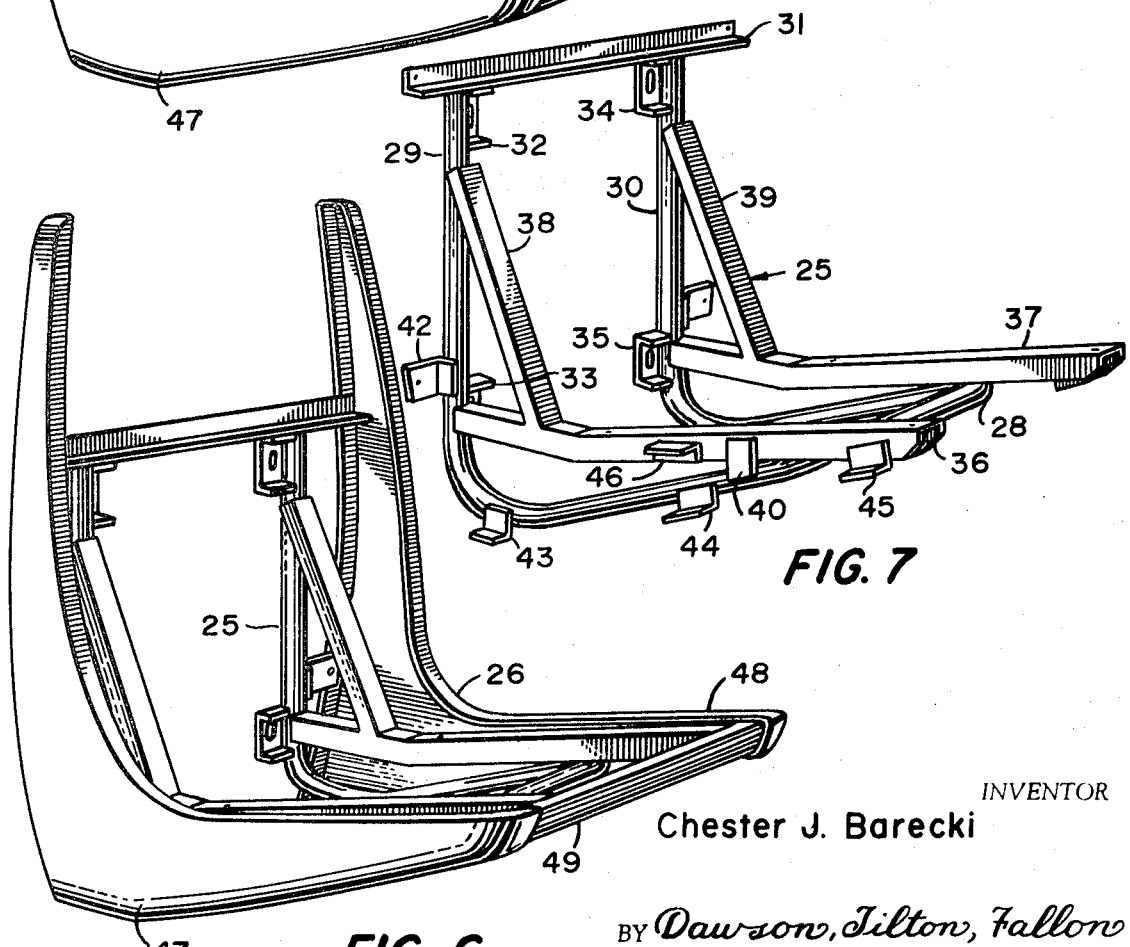
FIG. 6
FIG. 7
INVENTOR
Chester J. Barecki
BY Dawson, Tilton, Fallon and Lungmus
ATTORNEYS

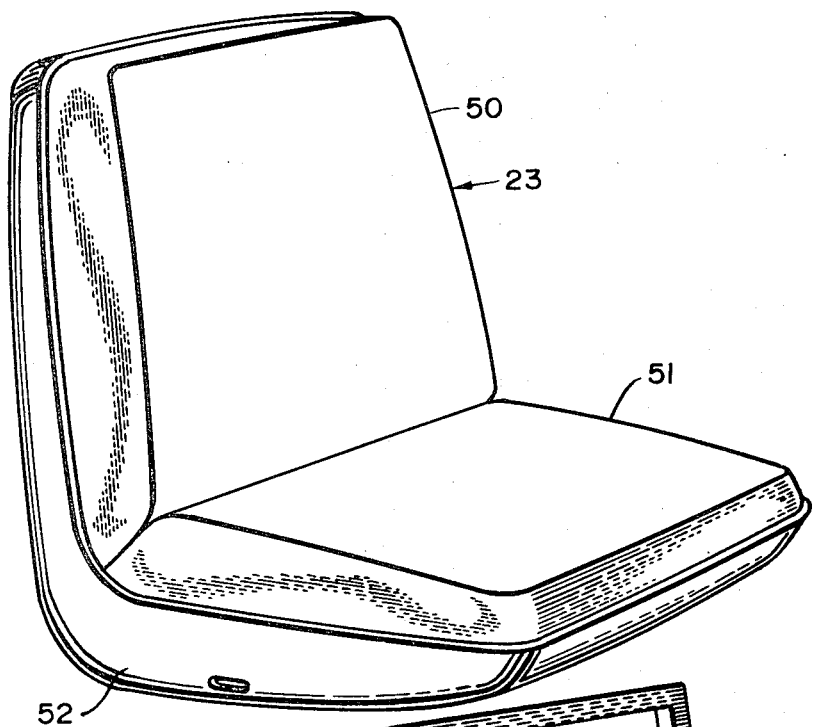
FIG. 8
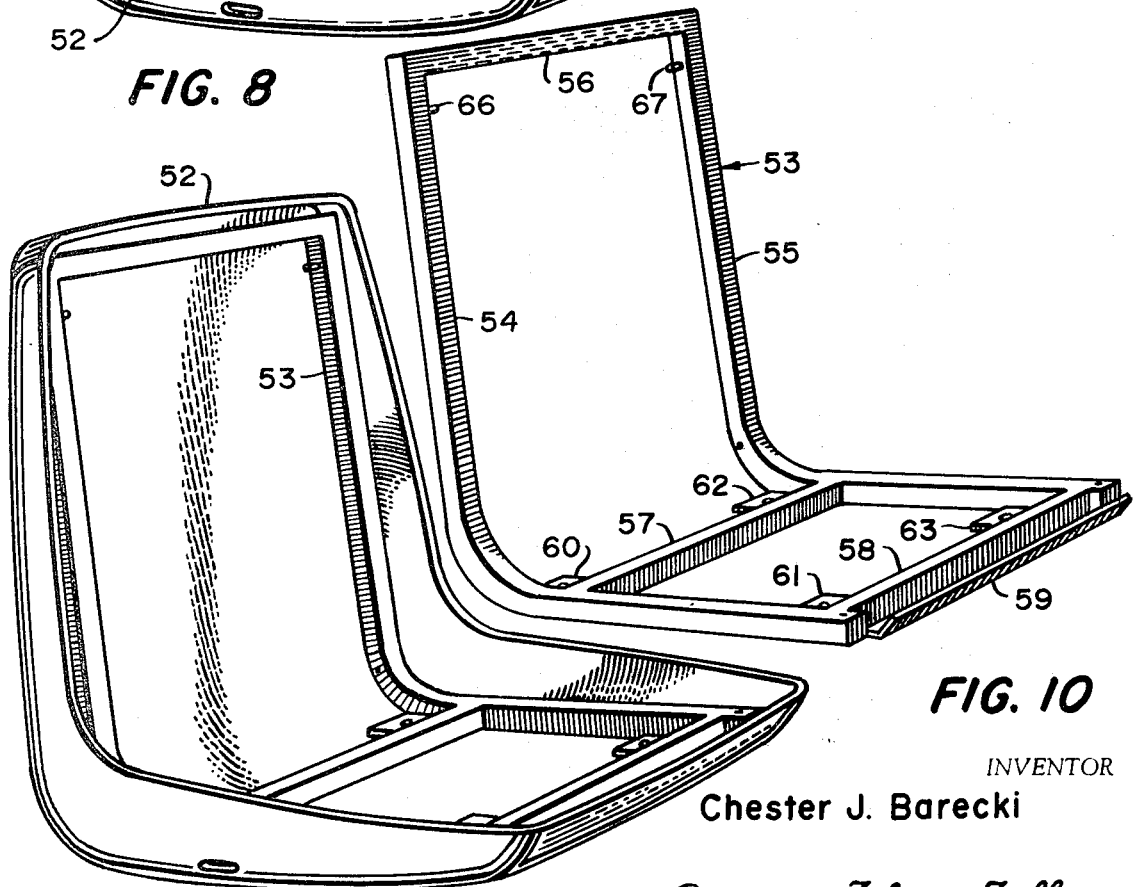
FIG. 9
FIG. 10
INVENTOR
Chester J. Barecki

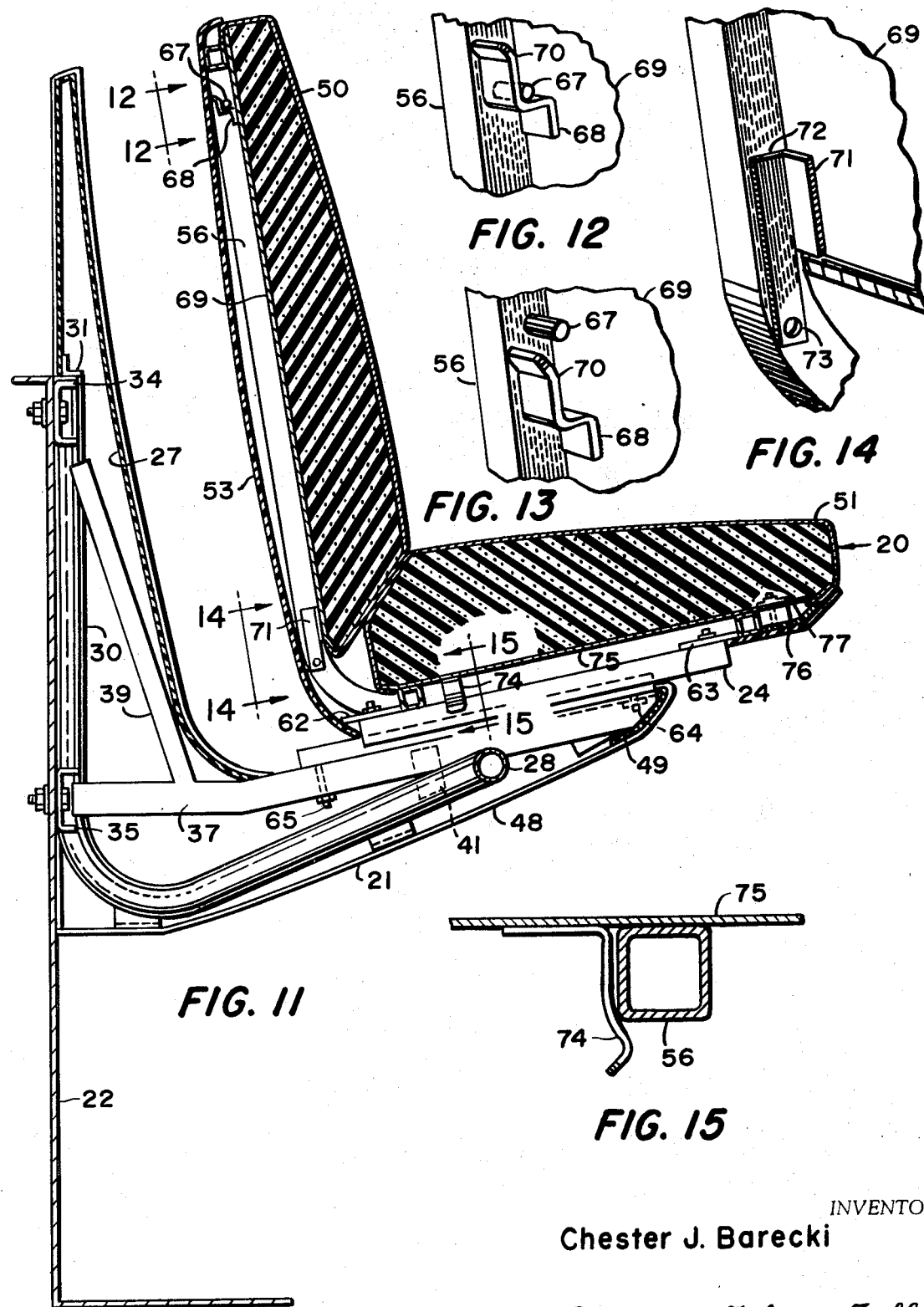

3,632,159

CANTILEVER VEHICLE DRIVER'S SEAT

BACKGROUND AND SUMMARY

Drivers' seats are usually mounted on large base members which fill the area below the seat allowing little rear footroom and making cleaning of the seat area difficult. Adjustment mechanism for raising the seat and for forward and rearward-positioning requires space in the base mounting area.

I have discovered that the driver's seat can be effectively suspended upon the front vehicle wall with struts or braces supporting a forward extending seat-carrying portion while also providing an inclination for elevating the seat as it advances, all of the parts being encased in a one-piece shell having no protrusions or recesses to provide easy cleaning and the back and seat cushions having concealed fastenings.

DRAWINGS

In the accompanying drawings:

FIG. 1 is a perspective view of the left side of the driver's seat;

FIG. 2, a similar view of the right side of the seat;

FIG. 3, a view similar to FIG. 2 but showing the seat extended on the base;

FIG. 4, a perspective view of the chair base with the seat portion removed;

FIG. 5, a perspective view of the adjustment mechanism which attaches the seat portion to the base;

FIG. 6, a perspective view similar to FIG. 4 but with the shroud removed to expose the metal frame;

FIG. 7, a perspective view of the metal frame of the base;

FIG. 8, a perspective view of the seat complete with cushions;

FIG. 9, a perspective view of the seat with the cushions removed;

FIG. 10, a perspective view of the metal seat frame;

FIG. 11, a sectional view of the left half of the chair showing the chair attached to the front wall of a vehicle and showing the attachment of the seat to the chair frame and the attaching of back and seat cushions with concealed fasteners;

FIG. 12, a fragmentary perspective view taken at line 12—12 of FIG. 11 to show the back cushion upper attachment;

FIG. 13, a view similar to FIG. 12 but with the clip below the pin and before attachment;

FIG. 14, a fragmentary perspective view taken at line 14—14 of FIG. 11 to show the back cushion lower attachment; and FIG. 15, a fragmentary sectional view, the section being taken at line 15—15 of FIG. 11 to show how the spring clip is used to hold the rear portion of the seat cushion in place.

DETAILED DESCRIPTION

Figures 1, 2:
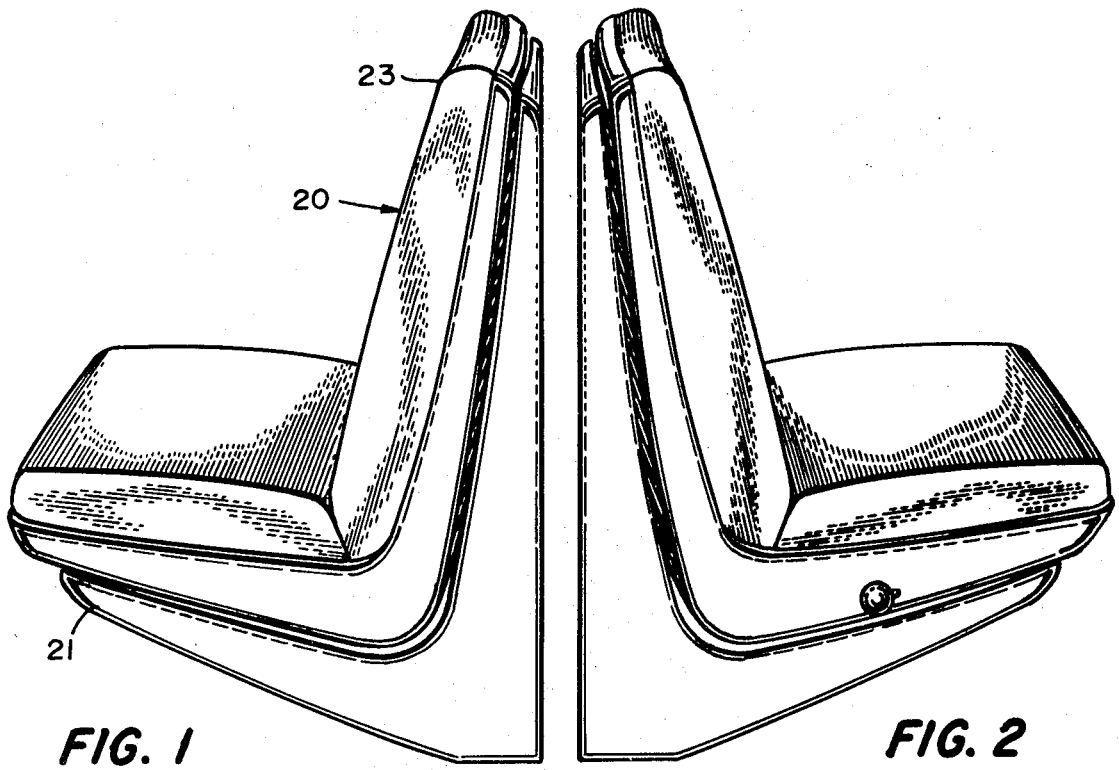
Figure 3:
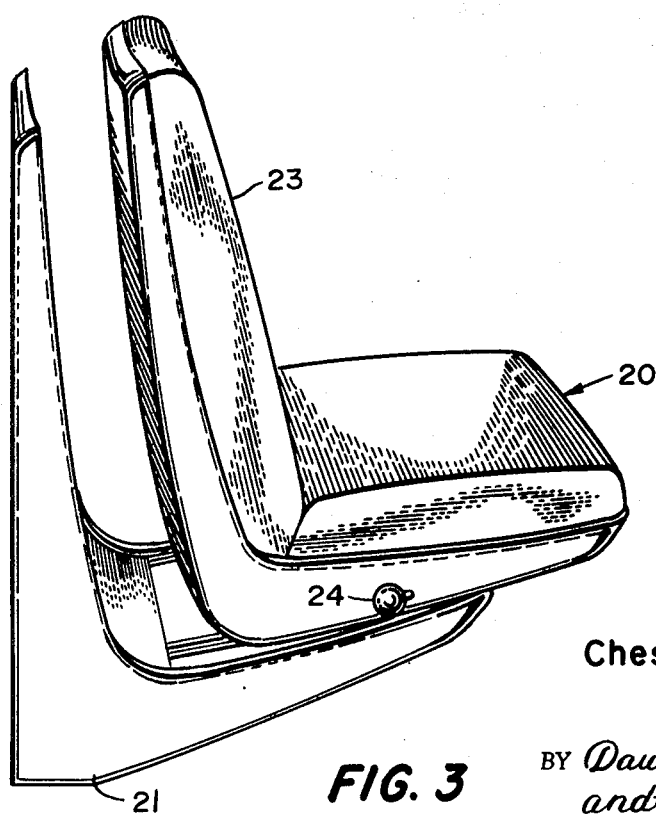

In the structure shown, the base frame comprises generally a vertical wall portion with means for attaching it at top and bottom portions to the vehicle front wall and with forwardly extending arms for supporting a seat, the vertical portion and forwardly extending portion being connected by inclined struts and the resulting cantilever structure rigidly supporting the seat above the floor.

In the illustration given, the driver's seat 20 consists of a base 21, attached to the vehicle wall 22, and supporting an adjustable seat portion 23 by means of a standard adjustment mechanism 24.

As shown more clearly in FIGS. 4–7, the base 21 consists of a metal frame 25, covered by a plastic shell 26, and having a plastic shroud 27 concealing the rear portion of the metal frame 25.

The metal frame contains a U-shaped round tubular frame 28, with the ends 29 and 30 bent upward, supporting a horizontal spacer angle 31 and having four wall attachment brackets 32, 33, 34 and 35 welded to the inside edges of the U-tube, two generally horizontal square tubes 36 and 37 resting between the raised ends 29 and 30 and the forward portion of the round tube 28, and two channel braces 38 and 39 to rigidize and support the raised tube ends 29 and 30. The forward portion of the round tube 28 and the square tubes are joined by two small metal ties 40 and 41 welded in place. There are several supporting angles 42, 43, 44, 45 and 46 on each side of the frame to hold the plastic shell 26 in place. The shell is also held at both ends of the spacer angle 31.

The base shell 26 is made up of two side panels 47 and 48, a front piece 49, and a shroud 27. As shown more clearly in FIGS. 8, 9, and 10, the seat portion 23 has a back cushion 50 and a seat cushion 51, a one-piece plastic seat shell 52, and a metal seat frame 53.

The metal seat frame 53 is constructed of square tubing. It has two side tubes 54 and 55, an upper stretcher tube 56, a lower rear stretcher tube 57, and a front stretcher tube 58. It also has a continuous angle plate 59 along the front edge to give added support to the front edge of the plastic shell 52. There are four attachment plates 60, 61, 62 and 63 for attaching the seat frame 53 to the base frame 25 by means of the adjustment mechanism 24. This can be seen in FIg. 11. Two short bolt studs 64 and two longer bolt studs 65 attach the mechanism directly to the metal base frame.

The adjustment mechanism is a standard and well-known structure and need not be described in detail. It consists, as shown best in FIGS. 5 and 11, of two slidably related members, one of which is secured to the seat bracket and the other to each forwardly projecting arm 36 or 37, the lower member of the adjustment mechanism 24 being secured to the arm 36 or 37 by bolts 64 and 65. It will be understood that any suitable adjustment mechanism may be employed for permitting adjustment between the seat structure and the base support structure members 36 and 37.

There are two pins 66 and 67 on the inside of the upper side tubes 54 and 55 which are part of the upper concealed cushion fasteners, as shown best in FIGS. 11, 12 and 13. The upper back cushion fastener clips 68 are welded to the metal back cushion support panel 69. As the cushion is raised on the side tubes, the clip projection 70 slides behind the pin and holds the cushion snugly in place.

As shown best in FIGS. 11 and 14, the lower concealed fasteners 71 are welded to the lower portion of the back cushion support panel 69. The long arm 72 of the angle rests against the inside edge of the frame side tube and is fastened to it by a screw 73 which is located low enough to be inserted from the front side of the cushion.

The seat cushion 51 is held in place by two half clips 74 welded to the rear portion of the seat cushion support panel 75 on the inside of each seat frame side tube 54 and 55 and by two bolts 76 at the front, inserted from below, through holes in the plastic shell 52, through the front ends of the side tubes 55 and 56, and into weld nuts 77 in the seat cushion.

If desired, an assist spring (not shown) may be placed between the seat frame and the base frame with one end connected to the right rear attachment plate 60 of the seat frame and the other end attached to the front edge of the right square tube 36 of the base.

The plastic shroud 27 may be provided with two access holes and plastic plugs 79 for closing the same and thus facilitating the mounting of the chair to the wall. The two holes are located directly in front of the upper wall attachment brackets 32 and 34, as shown best in FIGS. 4 and 7.

While in the foregoing specification I have set out specific structure in considerable detail for the purpose of illustrating embodiments of the invention, it will be understood that such details may be varied widely by those skilled in the art without departing from the spirit of my invention.

What is claimed is:

1. In combination with a generally vertical vehicle wall, a cantilever U-shaped base frame having its end portions bent upwardly and secured to said vehicle wall and its lower portion extending forwardly, a generally horizontal seat-support frame secured at its rear to said upwardly extending end portions and at its front to said forwardly extending base frame portion, and a seat carried by said seat support frame.

2. The structure of claim 1 in which diagonal struts connect said upwardly extending base portions and said seat support frame.

3. The structure of claim 1, in which said seat support frame is inclined outwardly and upwardly.

4. The structure of claim 3, in which said seat is slidably mounted on said seat support frame.

5. A cantilever seat structure adapted to be suspended upon a generally vertical vehicle wall and comprising a base frame of generally U-shape having its end portions generally vertical and equipped with means for attaching them to the vehicle wall and having its lower portion bent forwardly in a slightly upwardly inclined plane, a generally horizontal seat support frame anchored at its rear to said base ends and at its front to said forwardly extending base portion, struts connecting said vertical portions of said base and said seat support frame, and a seat carried by said seat support frame.

6. The structure of claim 5, in which said base is enclosed by a plastic shell.

7. The structure of claim 5, in which said seat is slidably mounted on said seat support frame.

8. The structure of claim 5, in which said base frame is formed of metal tubes of generally circular cross section.

9. The structure of claim 5, in which said U-shaped base frame is formed of tubes of circular cross section and said seat support base is formed of tubes generally square in cross section.

10. The structure of claim 5, in which a plastic shell encloses sides of said base frame and a separate slidably related plastic shell encloses sides of said seat support frame.

* * * * *